Patented July 20, 1948

2,445,319

UNITED STATES PATENT OFFICE 2,445,319

METHOD FOR THE MANUFACTURE OF QUATERNARY NITROGEN COMPOUNDS

Heinz-Joachim Engelbrecht, Dessau, Germany, assignor, by mesne assignments, to American Hyalsol Corporation, Wilmington, Del., a corporation of Delaware No Drawing. Application April 18, 1940, Serial No. 330,356. In Germany April 22, 1939

3 Claims. (Cl. 260—295)

It has been found that valuable quaternary nitrogen-compounds are obtainable by causing the reaction of oxo-compounds or substances supplying oxo-compounds in equivalent amounts and in the presence of halogen-hydracids, upon diamino-compounds of the general formula

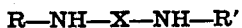

R—NH—X—NH—R' wherein R and R' respectively stand for a preferably higher molecular carbon-acid-(R.CO—), sulfonic acid-(R.SO₂—) or carbamine-acid ester-(R.O.CO—) residue, and X for any hydrocarbon residue, and in adding the thus obtained reaction-products to tertiary organic bases.

The group of diamino-compounds applied as initial stuffs concerns diamines symmetrically substituted on the nitrogen atoms by carboxylic-acid-, sulfonic acid- or carbamine-acid ester residues. The hydrocarbon residue X contained in these diamines is preferably low-molecular and it may be acyclic or cyclic, ramified- or non-ramified-chained. The hydrocarbon residues contained in the residues R and R' may be of any low-molecular or higher-molecular, ramified- or non-ramified-chained, similar or heterogeneous nature. If there exists at least one higher-molecular aliphatic or mixed aliphatic-cycloaliphatic or, respectively, aliphatic-aromatic hydrocarbon residue of at least 6 carbon atoms, we obtain products of a technically particular interest. In this case the hydrocarbon residues contained in the residues R and R' may also contain substituents or hetero-atoms such as oxygen or sulfur or any known atom groups containing these atoms.

Among the diamino-compounds suitable for the present method as initial stuffs there are, e. g., N,N'-diacetyl-methylene-diamine, N,N'-dicaproyl-methylene-diamine, N,N'-dilauryl-butylidene-diamine, N,N'-dioleyl-methylene-diamine, N-octa-decoyl-N'acetyl-methylene-diamine, N-montanoyl-N'-acetyl-methylene-diamine, N,N'-dimontanoyl-ethylidene-diamine, N,N'-dibehenoyl-ethylidene-diamine, N,N'-dioctyl-sulfo-methylene-diamine, N,N'-diricinoleyl-sulfo-methylene-diamine, N,N'-diethoxy-carbo-methylene-diamine, N,N'-dilauroxy-carbo-methylene-diamine, N,N'-dimontanyl-oxycarbo-methylene-diamine, N-montanyl-oxycarbo-N'-ethoxycarbo-methylene-diamine and the like.

As far as applying the present methods are concerned we have to deal with carbon-acid- and sulfonic acid-derivatives which are obtained according to well known methods, e. g., by the condensing of carbon-acid- or sulfonic acid-amides with aldehydes in the presence of small amounts of condensing stuffs; the production of the carbamine-acid-derivatives is carried out in a similar known way from the carbamine-acid esters.

Following the present invention we now cause the reaction of oxo-compounds or any substances supplying same upon the aforesaid diamino-compounds in the presence of halogen-hydracid.

Among the oxo-compounds applicable for the present invention we are to consider any aldehydes and ketones such as formaldehyde, acetaldehyde, butyraldehyde and the like, acetone, methyl-ethyl-ketone, diethyl-ketone and the like, and among the substances supplying oxo-compounds there are para-formaldehyde, trioxymethylene, hexamethylene-tetramine, formaldehyde-bisulfite, methylal and the like. As halogen-hydracid we consider practically chloro-hydracid, but also the bromo- and iodine-hydracid are suitable to perform the present method.

The conversion between these initial substances is carried out in equivalent amounts, i. e., upon 1 mol of the diamino-compounds we cause the reaction of 1 mol of oxo-compounds or a substance supplying oxo-compounds, or—at the conversion on both nitrogen-atoms of the diamino-compounds—of 2 mols of oxo-compounds or, respectively, a substance supplying same, always in the presence of halogen-hydracid. The conversion is carried out at room-temperature or likewise at higher temperatures. At the conversion we are allowed to co-employ solvents or diluents such as hydrocarbons, e. g., benzol, halogen-hydrocarbons and the like.

The mono- or di-halogen-alkyl-compounds evolving at this conversion from the diamino-bodies are now added to tertiary organic bases.

As tertiary organic bases there are all those known tertiary amines to be considered, which can be obtained from ammonia or from the known hetero-cyclic nitrogen-bases of the organic chemistry, e. g., tri-alkyl-amine such as tri-methyl-amine, triethyl-amine, tricyclo-alkyl-amine, triaryl-amine or, respectively, mixed types of these series, pyridine, quinoline, alkyl-pyridines, alkyl-quinolines, alkyl-piperidines and the like. In this case the tertiary amines may also contain higher molecular hydrocarbon residues of at least 6 carbon atoms.

The conversion between the mono- or di-halogen-alkyl-compounds and the tertiary bases is carried out in a way known in itself while forming a quaternary nitrogen-compound with one or two quaternary nitrogen groups. The adding may be performed at room-temperature or at a higher temperature and eventually in the presence of solvents or diluents such as benzol, toluol, benzine, chloro-hydrocarbons, acetone, ether, butyl-acetate, pyridine etc.

Among the compounds obtainable in this way according to the present invention we cite, e. g., the additive product of N, N'-dilauroyl-N-chloromethyl-methylene-diamine to 1 mol of trimethyl-amine, the additive product of N-lauroyl-N' - acetyl - N'-chloromethyl-methylene-diamine to 1 mol of pyridine, the additive product of N,N'-dimontanoyl - N, N' - dichloromethyl-ethylidene-diamine to 2 mols of pyridine, the additive product of N,N' - diethoxy - carbo - N'-chloromethyl-methylene-diamine to 1 mol of cetyl-piperidine, the additive product of N,N'-dioctadecyl-oxycarbo - N' - chloro-propyl-ethylene-diamine to 1 mol of quinoline, the additive product of N,N'-diricinoleyl - oxycarbo - N,N' - dichloromethyl - butylene-diamine to 2 mols of pyridine.

These compounds are soluble in water and in organic solvents and have the character of surface-active soap-like substances. Moreover these compounds react with hydroxyl-, amino- or mercapto - groups - bearing stuffs forming chemical compounds. Particularly textiles of any kind such as cotton, cellulose, artificial silk, wool, natural silk in the form of flocks, fibres, spinnings or tissues, furs, feathers and similar materials may be treated with solutions of such stuffs by soaking, drying and advantageously warming at higher temperatures, whereby the materials are covered with fast water-repelling impregnations.

The quaternary nitrogen-compounds corresponding to the present invention distinguish themselves particularly by the fact that they are neither sticking nor hygroscopic, but they are representative of dry powders allowing a very easy application and economical use.

The present method may also be carried out in reacting the oxocompounds or stuffs supplying same in equivalent amounts with carboxylic- or sulfonic-acid amides or carbamic-acid esters in the presence of halogen-hydracid and in adding the thus obtained reaction-products to tertiary organic bases.

As suitable initial substances for the present method we consider any acyclic and/or cyclic carboxylic-acid- or sulfonic acid-amides or carbamine-acid esters such as acetic acid-amide, caproic acid-amide, stearic acid-amide, oleic acid-amide, montan acid amide, naphthenic acid amides, resinic acid amides, alkyl-benzoic acid-amides, alkyl-naphthoic acid-amides and the like, further the carbamine-acid-ethyl ester, carbamine-acid-octyl - ester, carbamine - acid - cetyl-ester, carbamine-acid-behenyl-ester, carbamine-acid-naphthenyl-ester and the like. The hydrocarbon residues of those compounds may in general be of a low- or higher-molecular, ramified- or non-ramified-chained nature and they may also contain substituents or hetero-atoms such as oxygen or sulfur or, respectively, any known atom groups containing these atoms.

As suitable oxo-compounds we consider the above-mentioned aldehydes and ketones and as halogen-hydracids the above-mentioned acids.

The conversion between these initial stuffs is carried out in equivalent amounts, i. e., we cause— in the presence of halogen hydracid—the reaction of 1 mol of oxo-compound or of a substance supplying same upon 1 mol of acid-amide or carbamine-acid ester respectively.

The conversion-products lead then to products of a particular technical interest, if they contain at least one higher-molecular hydrocarbon-residue, i. e., in emanating from higher molecular acid-amides or carbamine-acid esters containing no less than 6 carbon atoms either alone or combined with low-molecular acid-amides or carbamine-acid esters. The conversion is carried out at room-temperature or at higher temperatures and eventually in the presence of solvents and diluents such as hydrocarbons, e. g., benzol, halogen-hydrocarbons and the like.

Among the compounds obtainable at this stage of proceeding we cite, e. g., N,N'-dilauroyl-N-chloromethyl-methylene-diamine, N,N' - dimontanyl - N - chloromethyl - methylene-diamine, N-palmitoyl-N'-caproyl-N-α-chloro - ethyl - ethylidene-diamine, N,N'-dioctadecoxy-carbo-N-chloromethyl-methylene - diamine, N,N' - didodecyl-sulfo-N-chloromethyl-methylene-diamine, N,N'-diethoxy-carbo-N-chloromethyl - methylene - diamine and the like.

These halogen-alkyl-compounds are now added to tertiary organic bases. As tertiary organic bases we are to consider all known tertiary amines which can be derivated from ammonia or from the known hetero-cyclic nitrogen-bases of the organic chemistry, e. g., trialkyl-amines such as trimethyl - amine, triethyl - amine, tricyclo - alkyl-amines, triaryl-amines or, respectively, mixed types of these series, pyridine, quinoline, alkyl-pyridines, alkyl-quinolines, alkyl-piperidines and the like. In this case the tertiary amines may also contain higher-molecular hydrocarbon-residues of at least 6 carbon atoms.

The conversion between the halogen-alkyl-compounds and the tertiary bases is carried out in a way known in itself while forming a quaternary nitrogen-compound. The adding may be done in the presence of solvents or diluents such as benzol, toluol, benzine, chloro-hydro-carbons, acetone, ether, butyl-acetate, pyridine etc. at room-temperature or higher temperatures.

Compounds obtainable in this way are, e. g., the additive product of N,N'-dioctadecyl-N-chloromethyl-methylene-diamine on trimethyl-amine, the additive product of N,N'-dimontanoyl-N-α-chlorobutyl - butylidene - diamine on pyridine, the additive product of N,N'-dihexadecyl - oxycarbo-N - chloromethyl - methylene-diamine on methyl-piperidine, the additive product of N-dodecyl-oxycarbo-N'-octyloxycarbo-N-chloromethyl-methylene - diamine on quinoline and the like.

These compounds have the same properties and allow of being applied in the same way as the above-mentioned quarternary nitrogen - compounds.

*Example 1*

Into a mixture of 320 parts by weight of N,N'-dioctadecyl - oxycarbo - methylene - diamine, 165 parts by weight of trioxy-methylene and 800 parts by weight of benzol we introduce, while stirring, at a temperature of 20 to 50° C., chlorohydrogen-gas till a clear solution is obtained. After separating the reaction-water and after cooling the solution is freed from solvent in vacuo. The residue—the corresponding chloromethyl compound—represents a wax-like mass.

200 parts by weight of this chloromethyl compound are warmed together with 140 parts by weight of benzol in 27.8 parts by weight of pyridine up to 40 to 50° C. while stirring. The conversion is completed as soon as the solution has become clear. By distilling off the solvent we obtain the additive product of N,N'-dioctadecyloxycarbo-N-chloromethyl-methylene-diamine on 1 mol of pyridine, which after drying results as a very fine and dry white powder. The yield is quantitative.

The thus obtained product is soluble in water and in an aqueous solution it shows a strong lathering-effect. If we soak artificial silk satin with such an aqueous solution this material, after drying and heating up for 10 minutes to 100 to 140° C., will get excellent water-repelling properties. The impregnation is fast to soap- and benzine-washing.

In carrying out the treatment of the N,N'-dioctadecyl - oxycarbo - methylene-diamine with trioxy-methylene and chloro-hydrogen gas in benzol in the presence of 33 parts by weight in- instead of 16.5 parts of trioxy-methylene, we obtain—while maintaining all other described conditions—a chloro-methyl compound allowing to be converted with a larger amount of pyridine. In this case we get the additive product of N,N'-dioctadecyl - oxycarbo.- N,N' - dichloro - methyl-methylene-diamine to 2 mols of pyridine, which is likewise soluble in water and shows similar properties as the abovementioned additive product.

*Example 2*

A suspension consisting of 164 parts by weight of N,N'-dilauroyl-methylene-diamine, 800 parts by weight of benzol and 26.5 parts by weight of trioxy-methylene, is treated at room-temperature with chloro-hydrogen gas while stirring, till the solution has become clear. After separating the reaction-water and after distilling off the solvent we convert the residue with pyridine at about 20 to 30° C. After working up we obtain the additive product of N,N'-dilauroyl-N,N'-dichloro-methyl-methylene-diamine to pyridine which is soluble in cold water. The aqueous solution is of a good wetting-out and lathering-power. Cellulose, when treated in such an aqueous solution and dried and heated up to 100-120° C. for 1 to 2 hours, is of a soft feel and shows a fast water-repelling impregnation.

In the same manner we may treat the N,N'-distearoyl-ethylidene-diamine with trioxy-methylene and chloro-hydrogen. The additive product of the obtained chloro-methyl compound to tri-methyl-amine, is likewise soluble in water and it shows the same properties as mentioned above.

*Example 3*

A mixture of 1000 parts by weight of octadecyl-carbamine-acid ester, 2800 of benzol and 106 of trioxy-methylene, is treated at 50 to 60° C. with chloro-hydrogen gas while stirring and till a clear solution is obtained. After separating the reaction-water and cooling down to room-temperature we eventually filter and free the product from the solvent in vacuo. The chloro-methyl compound remaining as residue represents a wax-like mass containing 5.7% of chlorine.

200 parts by weight of this chloromethyl compound are warmed up to about 40 to 50° C. together with 140 parts by weight of benzol and 27 parts by weight of pyridine while stirring and till a clear solution is obtained. From this solution the obtained additive product of N,N'-dioctadecyl - oxycarbo - N-chloromethyl-methylene - diamine on pyridine is isolated, which after drying represents a white and very fine powder soluble in water and supplying an aqueous lathering solution.

Tissues made of artificial silk, cellulose and the like and treated with such an aqueous solution show—after drying at about 50° C. and subsequent heating up to 100-140° C. for about 10 minutes—a fast water repelling effect which cannot be eliminated neither by soap- nor by benzine-washing.

I claim:

1. A compound selected from the group consisting of the condensation product of N,N'-dilauroyl-N,N'-dichloromethyl-methylene diamine represented by the formula

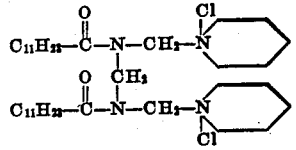

and the compound having the formula

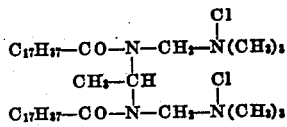

2. As a new compound the condensation product of N,N' - dilauroyl - N,N' - dichlormethyl - methylenediamine and pyridine.

3. A compound having the formula:

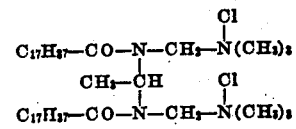

HEINZ-JOACHIM ENGELBRECHT.

REFERENCES CITED

The following references are of record in the file of this patent:

UNITED STATES PATENTS

| Number | Name | Date |
| --- | --- | --- |
| 2,146,392 | Baldwin | Feb. 7, 1939 |
| 2,209,383 | Bock | July 30, 1940 |